United States Patent [19]

Simonsen et al.

[11] 4,117,720
[45] Oct. 3, 1978

[54] ELECTRIC MEASURING DEVICE HAVING A SMALL-BORE LIQUID CONTAINER WITH IMPROVED ELECTRODE SEALING MEANS

[75] Inventors: John Simonsen, Canandaigua; Bruce Douglas Gibson; Heinz Walter Gruner, both of Irondequoit, all of N.Y.

[73] Assignee: Sybron Corporation, Rochester, N.Y.

[21] Appl. No.: 747,709

[22] Filed: Dec. 6, 1976

[51] Int. Cl.² .............................................. G01F 1/58
[52] U.S. Cl. ............................................... 73/194 EM
[58] Field of Search .................... 73/194 EM; 310/11

[56] References Cited

U.S. PATENT DOCUMENTS

| 2,949,551 | 8/1960 | Sturgeon ................... 73/194 EM X |
| 3,171,990 | 3/1965 | Bennett ...................... 73/194 EM X |
| 3,358,075 | 12/1967 | Hunt ........................... 73/194 EM X |
| 3,387,492 | 6/1968 | Mannherz et al. ............. 73/194 EM |
| 3,813,938 | 6/1974 | Grosch et al. ................ 73/194 EM |

FOREIGN PATENT DOCUMENTS 2,332,594  1/1975  Fed. Rep. of Germany ..... 73/194 EM

*Primary Examiner*—Charles A. Ruehl
*Attorney, Agent, or Firm*—Theodore B. Roessel; Joseph C. MacKenzie

[57] ABSTRACT

An electromagnetic flowmeter having a small-bore flow tube having a thick-walled plastic tube having a conically-relieved electrode-receiving bore. A compression ring around the conical part of the tube squeezes the plastic sealingly between the electrode and the ring. In assembly, compressive force exerted by Belleville springs or washers causes the plastic to flow into sealing contact with the electrode.

15 Claims, 7 Drawing Figures

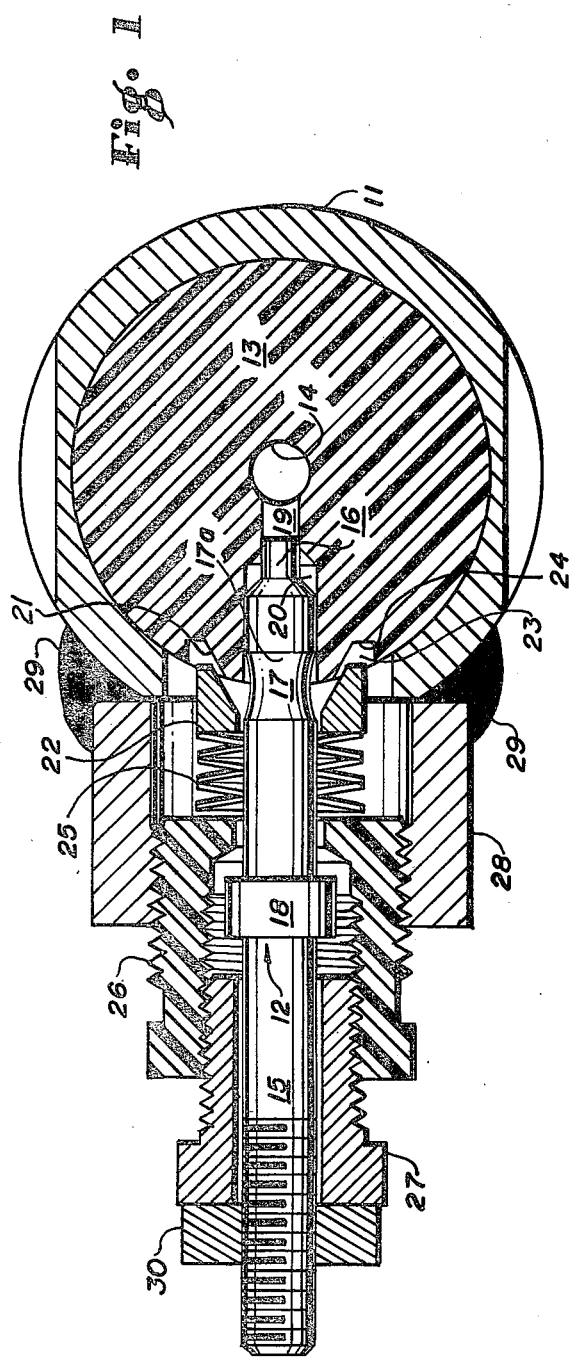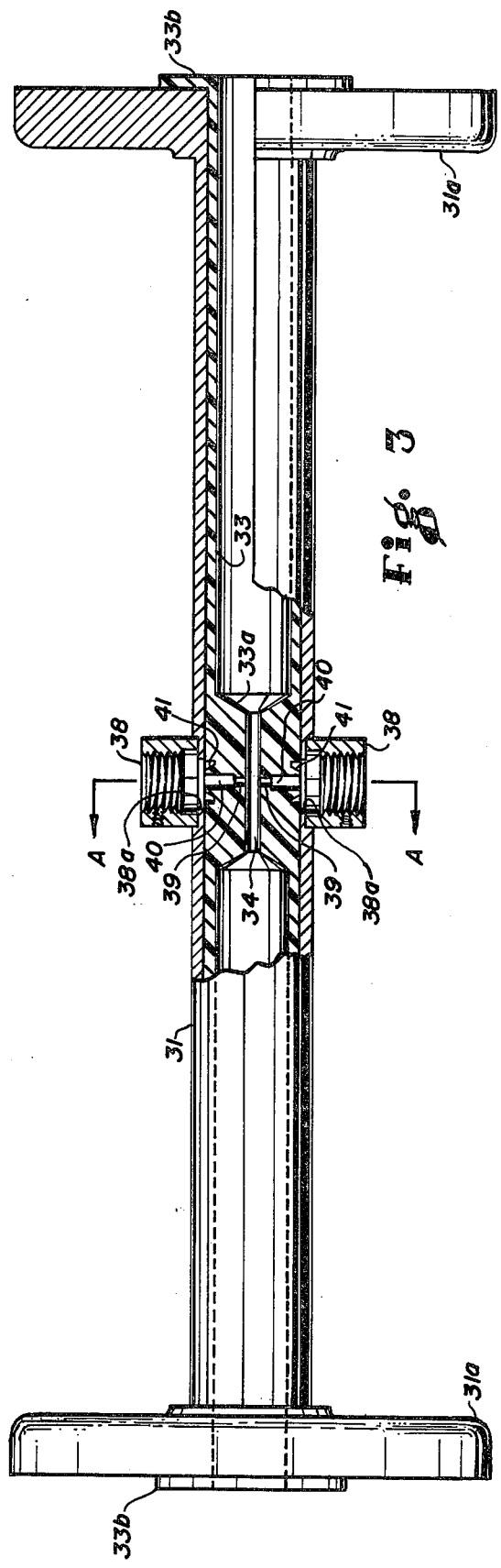

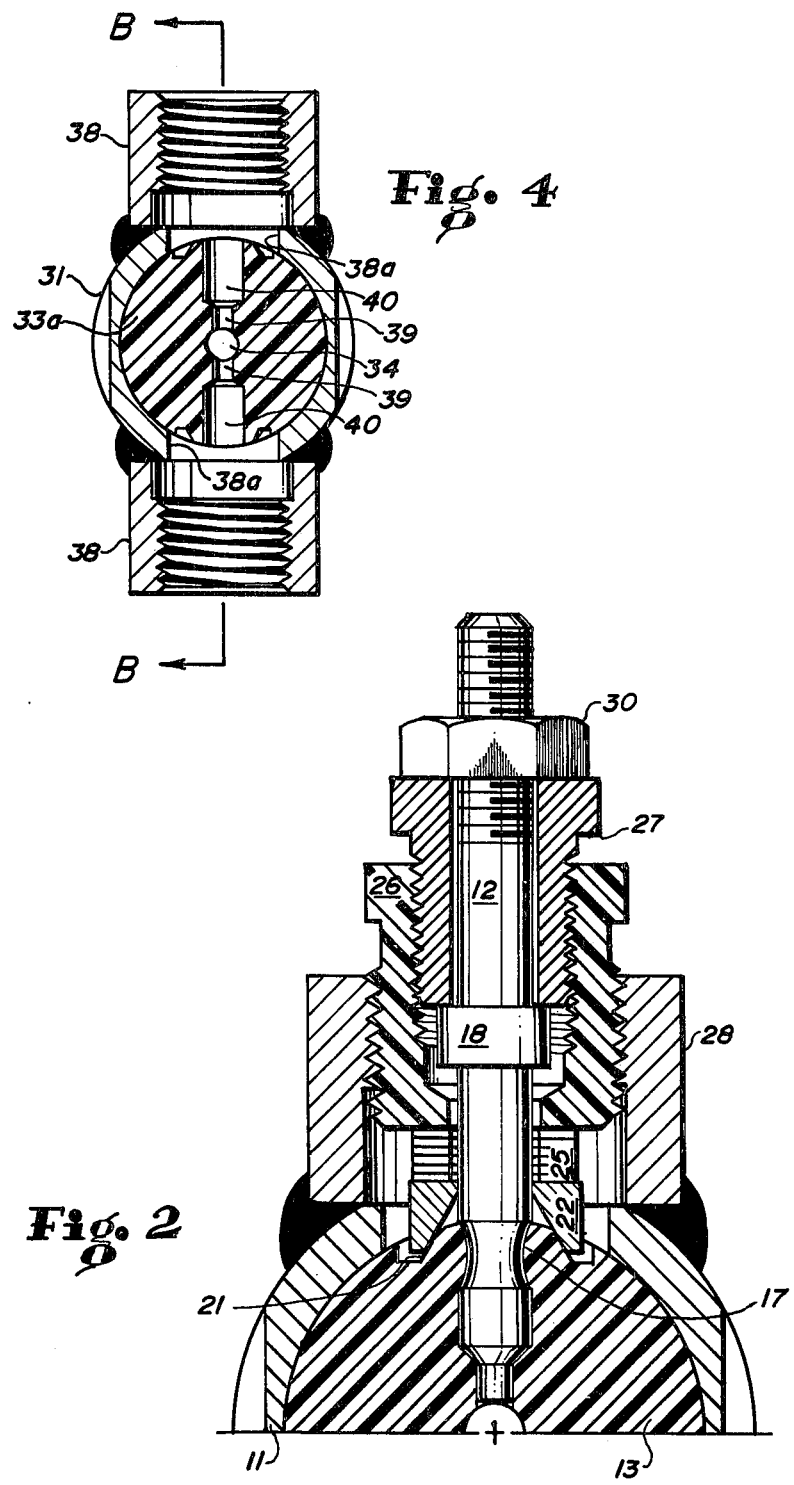

ELECTRIC MEASURING DEVICE HAVING A SMALL-BORE LIQUID CONTAINER WITH IMPROVED ELECTRODE SEALING MEANS

FIELD OF THE INVENTION

The present invention relates to electrical measuring devices for metering or testing fluids, e.g., measuring the flow of an at least slightly electrically conductive liquid, wherein at least one electrode is sealingly mounted in the wall of the liquid containing structure, such as a tube, from which the electrode is insulated.

DESCRIPTION OF THE PRIOR ART

In the prior art, the container is often a metal pipe lined with a suitable plastic, and having electrodes, for example, as in U.S. Pat. No. 3,347,568 to Weeden, Jr. et al. However, where the effective bore of the pipe is rather small, it becomes very difficult both to install a lining in the pipe, and to seal the electrodes effectively.

SUMMARY OF THE INVENTION

According to the present invention, we provide a small-bore, thick-walled plastic or elastomer body in the form of a tube wherein the tube wall has an electrode-receiving bore therethrough receiving an electrode and the tube wall is relieved about the electrode-receiving bore, whereby to provide a sort of collar, conical, for example, around the bore opening. The electrode has a corresponding portion, also more or less conical, for example. By compression, the relief or collar seals the electrode in, the compressive force being exerted by a compression ring on the collar, forcing the material against the corresponding portion of the electrode.

In one specific embodiment, the tube has a thin-walled, liner-like extension and is contained in a stainless steel pipe having the same bore diameter as the outer diameter of the plastic tube. The compressive force is exerted through spring means which exerts compressive force during assembly, so as to conform the plastic to the electrode.

BRIEF DESCRIPTION OF THE DRAWINGS

FIG. 1 is an exploded partly cross-sectional view of one form of our invention, to scale, but somewhat larger than life.

FIG. 2 is a fragmentary view like FIG. 1, but with parts assembled together.

FIG. 3 is an elevation, partly in section, on the plane B—B of FIG. 4, of our invention adapted to electromagnetic flowmeters, full-scale.

FIG. 4 is an enlarged (twice scale) cross-section on the plane A—A of FIG. 3.

DESCRIPTION OF THE PREFERRED EMBODIMENTS

Figure 6:
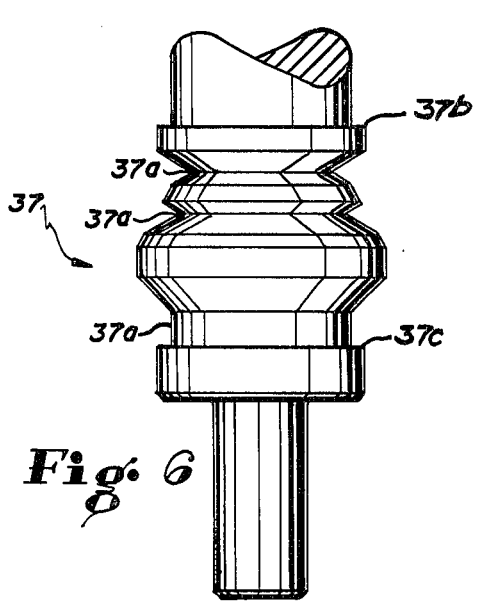
FIG. 6 is a detail of FIG. 5, enlarged to a scale of 10:1.

In FIG. 1, a right circularly cylindrical pipe 11 has a generally right circularly cylindrical electrode 12 projecting into a plastic body 13 providing a tube having a right circularly cylindrical bore 14 therein. Bore 14 is concentric with the bore of pipe 11, but much smaller than it in diameter.

Electrode 12 has threaded outer end 15, a reduced inner end 16, a reduced inner portion 17 and an enlarged intermediate portion 18. Inner end 16 corresponds to a similar bore portion 19 in body 13 which is the termination of a larger bore portion 20 in which fits approximately the inner quarter of electrode 12 (except reduced inner portion 17). Inner portion 17, although rounded, can be considered somewhat conical, in that the lower end thereof is effectively similar to the conical surface of a collar 21 provided by relief in body 13. Thus, around the outer end of bore portion 20, the material of body 13 has been cut away, leaving the more or less conical collar 21 of plastic surrounding the outer end of bore 20. Over the collar is a compression ring 22, which is externally right-circularly cylindrical but inwardly conical, so as to fit the outer half or so of collar 21, thereby leaving an annular space 23 between ring 20 and the annular surface 24 relieved into body 13 about the bore 20.

A set of Belleville springs or washers 25, a compression screw 26 made of electrically insulating material, a positioning screw 27, a nut 28, and a jam nut 30, substantially complete the electrode mounting assembly of FIG. 1. Nut 28, welded to pipe 11, as indicated at 29, has screw 26, interiorly threaded therein, screw 26 in turn having screw 27 threaded therein, with threaded outer end 15 of electrode 12 being loosely received in screw 27, and threaded into jam nut 30.

It will be evident from the foregoing that screw 26 can be screwed into nut 28 such as to compress ring 22 against collar 21, the compressive force being transmitted via Belleville springs 25. Likewise, the penetration depth into bore 14 of electrode 12 can be adjusted by means of screw 27, and jam nut 30. Thus, FIG. 2 shows electrode 12 advanced fully into bores 19 and 20, and the screw 26 has threaded into nut 28 sufficiently far that washers 25 have flattened and plastic material has extruded into the reduced portion 17 of electrode 12, with enlarged portion 18 of electrode 12 being held against screw 27 by jam nut 30. Consequently, electrode 12 is sealed substantially perfectly hermetically in place due to the powerful sealing force exerted via Belleville washers on the collar, which force squeezes the plastic collar 21 between ring 22 and the approximately conical region 17a of reduced portion 17, thereby deforming the collar into the space around portion 17. The Belleville washers, it will be observed, continue to exert such sealing force even if the plastic material takes a permanent set due to cold flow, as the washer stack will expand to take up slack, if any.

Our invention is especially suitable for narrow bore electromagnetic flowmeters, as shown in FIG. 3, where reference numeral 31 represents the usual flanged stainless steel flow tube having plastic lining 33. However, according to the invention, plastic lining also has a body portion 33a corresponding to body 13. Body portion 33a has a bore 34, through which flows the liquid, the flow of which is to be measured, and two pairs of bores 39 and 40, corresponding to bores 19 and 20 of body 13, FIG. 1, being in duplicate at opposite sides of bore 34 in order to provide for flow-induced voltage measurement. Likewise, nuts 38 are provided for performing the same function as screw 28, FIG. 1, and the outer ends of bores 40 are surrounded by conical collars 41 corresponding to conical collar 21, FIG. 1, and serving the same function as the latter.

The flow tube 31 has the usual flanges 31a, and the liner the usual flanges 33b. In this type of flowmeter the liner 33 is partly formed beforehand, a little longer than the tube 31, (but without flanges 33b, bores 39 and 40, and the collars 41), and of sufficient diameter as to have an interference fit in tube 31, which at this point will have the nuts 38 and the flanges 31a fixed thereto. Typically sleeve 33 is a fluorocarbon plastic.

After the sleeve 33 has been force-fitted in tube 31, with some of the lining projected from each end of tube 31 and with the body 33a centered between nuts 38, the ends of the lining 33 are swaged over flanges 31a to form flanges 33b, and bores 39 and 40 and collars 41 are formed by machining and drilling via the access permitted by nuts 38 and holes 38a in the side of tube 31.

Figure 5:
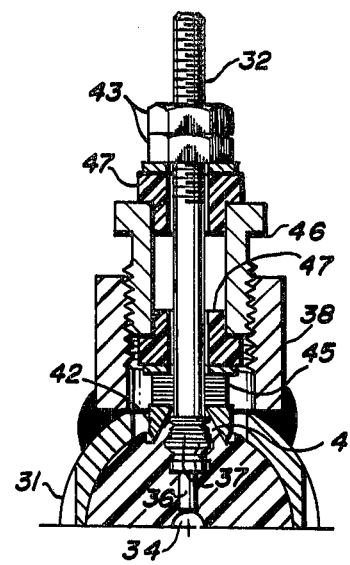
FIG. 5 is a view similar to FIG. 4, but has an electrode in place.

Like FIGS. 1 and 2, FIG. 5 shows an electrode, compression ring, lock nuts, compression screw, and Belleville washers, respectively denoted by reference numerals 32, 42, 43, 46 and 45. Electrode 32, unlike electrode 12, has a enlarged grooved portion 37, where the electrode 12 is necked down at 17, but, like electrode 12, electrode 32 has a reduced inner end 36 received in bore 39. In addition, electrode 33 is provided with electrically-insulating spacers 47, above and below screw 46, which keep the electrode from contacting the screw 46 or any other metal or conductive element in electrical contact with tube 31 and other meter structure.

The electrode 32 is assembled by putting a right-circularly cylindrical metal rod (not shown) in bore 34, the rod having such diameter as will provide the necessary depth of insertion of the electrode 32. An electrode 32 is then forced into each of the bores 39 and 40 until the electrode end faces contact the rod. The screw 46 is then screwed in until the Belleville washer stack is completely flattened, after which the rod is withdrawn and the meter is ready for use (when both electrodes have been inserted, of course).

FIG. 6 shows the lower end of electrode 32 in exact manufacturing proportions, wherein enlarged portion 37 has circumferential grooves 37a into which the plastic of collar 41 flows and seals the electrode. It is to be observed that, whereas the electrode 12 is rather easier to insert, the electrode 32, because its enlarged portion 37 distends bore 40, and due to the grooves 37a, traps the Teflon material between compression ring 42 and the electrode, more readily than in the species shown in FIGS. 1 and 2. The grooving also supports the Teflon against movement toward bore 40.

Figure 7:
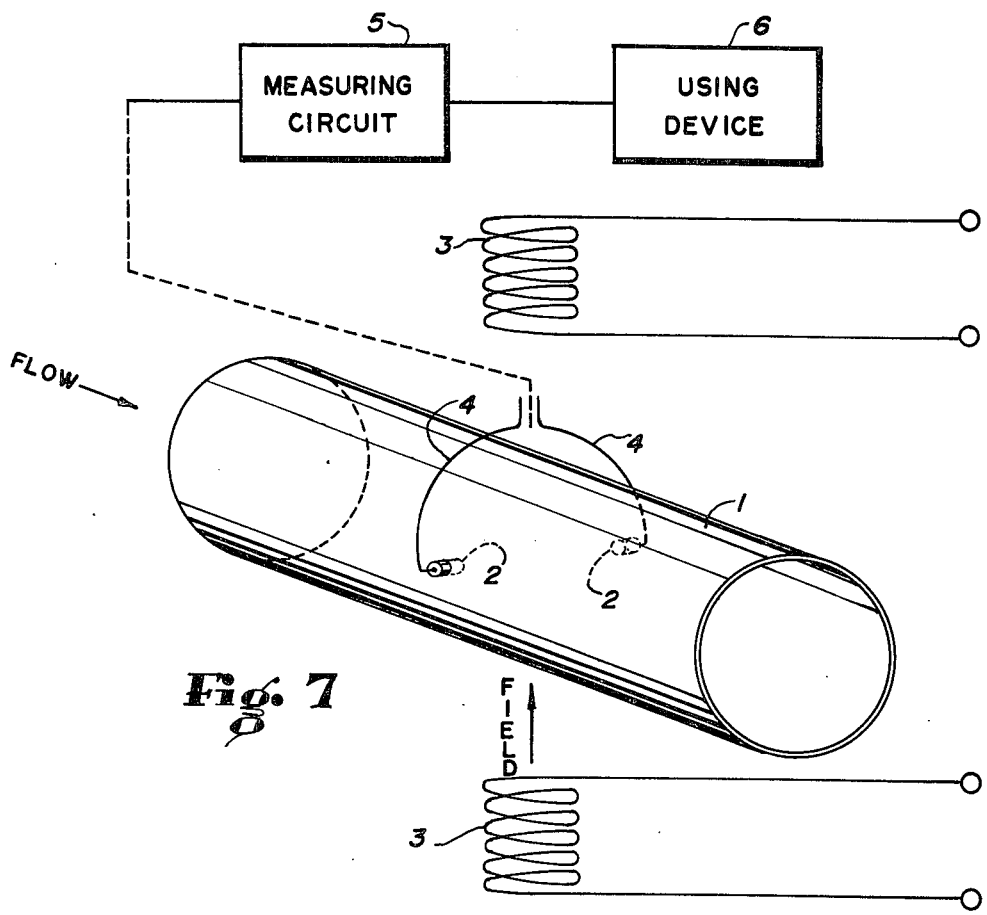
FIG. 7 is a diagram of an electromagnetic flowmeter in which our invention would be useful.

While there are a variety of electrical testing and measuring systems wherein it is desired to electrically contact a fluid in a pipe line, tank, or other conduit and/or container, our invention arises in the context of electromagnetic flowmeters, which we here disclose briefly but adequately for present purposes. Thus, FIG. 7 shows a non-magnetic flow tube 1 through which an at least slightly electrically-conductive fluid flows, generally a liquid, sometimes a slurry. Electrodes 2 are mounted in the tube wall diametrically opposite one another and in electrical contact with the fluid flowing through the tube. Field coils 3, which are to be electrically energized (AC or DC), are located on opposite sides of the tube so as to generate a magnetic field, the direction of which is, for example, up, as indicated by the arrow labeled FIELD. The tube 1 is either made of electrically-insulating material or is internally lined with same and electrically isolated from electrodes 2, so that when a conductive liquid flows through tube 1, there will be a flow-proportional voltage generated between the electrodes 2. The electrodes 2 are electrically connected by leads 4 to measuring circuitry 5 which conditions flow-generated voltage sensed at electrodes 2, such as to produce a flow-representative signal for a using device 6 which records, controls or performs some other useful function in a measure determined by the rate of flow through tube 1.

While the present invention is advantageous when used with any suitable resin, elastomer or other non-metallic material, having desirable chemical or physical properties with respect to the use the meter is to be put, it is particularly useful with fluorocarbons (so called "teflon"), and other such materials. Likewise, while the present invention would be useful in connection with a variety of electrical metering or test devices having electric measuring circuitry, it is particular suited to small-bore electromagnetic flowmeters. Thus, in the present case, the disclosed structures are used in electromagnetic flowmeters having flow tube bores 14 and 34 down to 0.1 inch, diameter and therefore practically impossible to treat after the manner of Weeden, Jr., et al., above-cited. In any event, the foregoing description will enable one skilled in the art to practice our invention to fullest advantage irrespective of the nature of the measuring device.

While we have described the plastic collars and corresponding electrode portions, as being conical in form, it is to be noted that our novel seal between electrode and collar depends basically on the body 13 or 33a having a portion, conical or otherwise, which can be deformed into sealing contact with the electrode circumference, regardless of this last's form. This is because the sealing force is taken up in the body 13 or 33a, which is massive as compared to the ring 22 or 42, and, moreover, is confined in the pipe 11 or 31, which cannot be significantly deformed by any amount of force likely to be exerted by way of compressing the collar into sealing relationship with the electrode, whereby while the collar deforms under compression, the body, as a whole, effectively does not.

The compressing force is that which can be exerted by the Belleville springs, for example, 100 lbs in all, when using typical fluorocarbon plastic. In practice, such force is exceeded in the course of initially compressing the collar around the electrode to achieve the seal, although it never approaches the 1,000 psi stress or so which is about the limit fluorocarbon plastic can support over the long term, at ordinary temperatures, without flowing substantially.

For example, in the assembly shown in FIGS. 5 and 6, initially nut 46 is torqued to 5 inch lbs., which flattens the washers 45. Then a regime of temperature cycling is applied to the assembly in order to assure conformity of the material of collar 41 to the grooved circumference of electrode portion 37. After the cycling, nut 46 is retorqued to 5 inch lbs. and nuts 43 are torqued to 1 to 2 inch lbs., thus drawing the portion 37 slight upward to again flatten the washers and, preferably, bring the inner surface of ring 42 into contact with the circumferential ledge 37b of portion 37. That is to say, the opening in the ring is lesser in diameter than the ledge 37b, which prevents ring 42 from being forced past the upper part of 37 and cutting off plastic in a groove 37a. Insofar as is concerned the position of electrode portion 36 with respect to bore, such position does not change materially during the torquing and cycling process. The body 33a, machined polytetrafluoroethylene, under the influence of heat softs slightly, and thus flows more readily under the stress due to the washers 45, into grooves 37a. During the heat cycling, the bore 34 has the previously mentioned metal rod in it which both supports the bore wall and prevents the electrode portion 36 from moving into the bore under the force of springs 45.

After the heat cycling, the washer stack may or may not be compressed solid. However, torquing nuts 43, which up to this point have been only finger tight, assures complete compression of the washers, which in fact now serve no immediate purpose, once they have done their job of driving ring 42 into contact with ledge 37b during heat cycling.

After the electrode is sealed in place, the metal rod (not shown) in the bore 34 is removed, and, preferably, the assembly is again recycled, this time to the highest expected service temperature, in order to stablize the dimensions of bore 34.

That one of grooves 37a next to the circumferential ledge 37c (FIG. 6) is provided in order to help fix the vertical position of the electrode, not to seal. The design of FIGS. 5 and 6 is intended for a range of 0.1 inch through 0.36 inch diameter of bore 34, while the outer diameter of body 33a is 0.7 inch for the entire range. In this range, the same electrode shape and dimensions are used except that the portion 36 is shortened and/or narrowed to the extent needed to suit the bore, without altering the rest of the electrode.

We claim:

1. An electric measuring device comprising a structure having a bore surrounded by a relatively thick deformable wall for containing fluid, said wall having a bore therethrough, such wall bore having one end opening into the first said bore and its other end opening through the exterior surface of said wall, said wall having an integral collar of compressible sealing material projecting outwardly of said first said bore, and said wall bore's said other end being surrounded by said collar;
    (a) said device also comprising electrodes, one such electrode being in said wall bore and projecting through said collar externally of said wall; there being compression means for compressing said collar toward and around said one electrode for sealing said one electrode in said wall bore;
    (b) said device also comprising measuring circuitry connected to said electrodes.

2. The electric measuring device of claim 1, wherein said compression means includes ring means fitted on said collar and compressive-force means for forcing said ring means down on said collar, and against said one electrode, for compressing the material of said collar into sealing contact with said one electrode.

3. The electric measuring device of claim 2, wherein said compressive-force means includes compression spring means through which compressive force is exerted on said ring means.

4. The electric measuring device of claim 2, wherein said collar is in the shape of a cone having its smaller end pointing away from the first said bore.

5. The electric measuring device of claim 4, wherein said compressive force means if provided on said one electrode to be movable toward said collar; said one electrode having a conical surface corresponding to said cone, said surface being within said collar, and the material of the said collar being forced by said compressive force means into contact with the entire said conical surface.

6. The electric measuring device of claim 5, wherein there are compression spring means, said ring means being between said collar and said compression spring means and said compression spring means being held under compressive stress by said compressive force means.

7. The electric measuring device of claim 1 including a tube liner, said tube liner being in the form of relatively this resilient walls having relatively large bores connected to each end of said structure such that said relatively large bores are connected by the first said bore.

8. The electric measuring device of claim 7, including a rigid-walled flow tube, and wherein the said walls the structure are interference-fitted into said rigid-walled flow tube.

9. The electric measuring device of claim 7 wherein said first said bore is small in diameter compared to the diameters of the last said bores of said liner.

10. The electric measuring device of claim 7, wherein said electrodes include a second electrode constructed and arranged like said one electrode but opposite thereto, and there being means for producing a magnetic field in said first said bore for providing an electromagnetic flowmeter.

11. The electric measuring device of claim 1, said one electrode being grooved in the part thereof surrounded by said collar.

12. The electric measuring device of claim 11, wherein the said part of said one electrode is enlarged, having a larger diameter than said wall bore.

13. The electric measuring device of claim 11, wherein the said part of said one electrode is reduced, having a lesser diameter than said wall bore.

14. The electric measuring device of claim 1, wherein said electrodes include a second electrode constructed and arranged like said one electrode but opposite thereto, and there being means for producing a magnetic field in said first said bore for providing an electromagnetic flowmeter.

15. The electric measuring device of claim 1, wherein said wall is confined within a substantially undeformable pipe, and said wall essentially consists of compressible sealing material.

* * * * *